(12) United States Patent
Takamura et al.

(10) Patent No.: US 8,514,464 B2
(45) Date of Patent: Aug. 20, 2013

(54) IMAGE FORMING APPARATUS

(75) Inventors: Daisuke Takamura, Fujinomiya (JP); Yoshihiro Ito, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 12/968,258

(22) Filed: Dec. 14, 2010

(65) Prior Publication Data

US 2011/0149354 A1 Jun. 23, 2011

(30) Foreign Application Priority Data

Dec. 18, 2009 (JP) ................................. 2009-288008
Nov. 30, 2010 (JP) ................................. 2010-266475

(51) Int. Cl.
*H04N 1/04* (2006.01)

(52) U.S. Cl.
USPC ........... 358/474; 358/498; 358/497; 358/496; 399/167

(58) Field of Classification Search
USPC ................. 358/474, 498, 497, 496, 401, 486; 399/167, 112, 110, 298, 299
See application file for complete search history.

(56) References Cited

U.S. PATENT DOCUMENTS

| | | | | |
|---|---|---|---|---|
| 3,661,383 A * | 5/1972 | Morrison | ....................... | 271/273 |
| 7,130,089 B2 * | 10/2006 | Yoshida | ....................... | 358/474 |
| 7,133,626 B2 * | 11/2006 | Kaiga et al. | ....................... | 399/110 |
| 7,447,466 B2 * | 11/2008 | Ikebata | ....................... | 399/110 |
| 7,680,431 B2 * | 3/2010 | Ikebata | ....................... | 399/107 |
| 7,782,498 B2 * | 8/2010 | Hoshi | ....................... | 358/474 |
| 7,924,479 B2 * | 4/2011 | Nogami | ....................... | 358/488 |
| 8,018,632 B2 * | 9/2011 | Walker et al. | ....................... | 358/498 |
| 8,089,666 B2 * | 1/2012 | Andoh et al. | ....................... | 358/498 |
| 8,164,806 B2 * | 4/2012 | Yang et al. | ....................... | 358/498 |
| 8,237,995 B2 * | 8/2012 | Yamazaki et al. | ....................... | 358/474 |
| 8,346,122 B2 * | 1/2013 | Watanabe | ....................... | 399/110 |
| 2009/0148179 A1 | 6/2009 | Tamura et al. | ....................... | 399/107 |
| 2011/0305480 A1 * | 12/2011 | Tanaami et al. | ....................... | 399/112 |

FOREIGN PATENT DOCUMENTS

| | | |
|---|---|---|
| JP | 2000-039827 | 2/2000 |
| JP | 2000-039872 | 2/2000 |
| JP | 2005-062326 | 3/2005 |
| JP | 2008-131338 | 6/2008 |
| JP | 2008-134301 | 6/2008 |
| JP | 2009-053315 | 3/2009 |
| JP | 2009-139817 | 6/2009 |

* cited by examiner

*Primary Examiner* — Negussie Worku

(74) *Attorney, Agent, or Firm* — Fitzpatrick, Cella, Harper & Scinto

(57) ABSTRACT

An image forming apparatus includes a cover member which is openable and closable with respect to main assembly of the image forming apparatus; and an image reading portion, movable to first and second positions, for reading an image of an original. The cover member is movable to first and second open positions with respect to the main assembly. The image reading portion is initially rested at the first position as the cover member is moved from a closed position to the first open positions, and then is movable from the first position to the second position in interrelation with movement of the cover member from the first open position toward the second open position.

15 Claims, 18 Drawing Sheets

IMAGE FORMING APPARATUS

FIELD OF THE INVENTION AND RELATED ART

The present invention relates to an image forming apparatus including an image forming portion at which an image forming unit for forming an image is detachably mountable to an apparatus main assembly (main assembly of the image forming apparatus) and including an image scanner for reading an original.

In the image forming apparatus such as a copying machine, the image scanner portion is disposed above the image forming portion and reads the original and then resultant information is recorded at the image forming portion on a recording material, which is then discharged. In such an image forming apparatus, in an electrophotographic type, an electrophotographic photosensitive member and a developing device are integrally assembled into a unit, which is detachably mountable to the apparatus main assembly in many cases. As a result, maintenance becomes easy.

In the image forming apparatus, there is a need to open and close a maintenance cover of the apparatus main assembly in order to demount and mount the image forming unit. For this purpose, in some cases, the maintenance cover is provided at an upper portion of the apparatus main assembly in order to permit access to the image forming unit from above the apparatus main assembly. In these cases, when the image scanner disposed above the image forming portion is fixed, a sufficient space is required to be ensured between the image forming portion and the image scanner portion in order to open and close the maintenance cover, so that the image forming apparatus is increased in size.

Japanese Laid-Open Patent Application (JP-A) 2008-134301, in order to open and close the maintenance cover without increasing the size of the apparatus main assembly, and image forming apparatus in which the image scanner portion is configured to be retractable from the apparatus main assembly in interrelation with an opening operation of the maintenance cover is disclosed. As a result, an operation during maintenance operation can be smoothly performed.

However, in the image forming apparatus disclosed in JP-A 2008-134301, the image scanner portion is interrelated with the maintenance cover during the opening operation of the maintenance cover but is not interrelated with the maintenance cover during a closing operation of the maintenance cover. For this reason, a user is required to close the maintenance cover and then is required to close the image scanner portion, so that operativity is poor.

In JP-A 2009-53315, the image scanner portion is configured to be opened in interrelation with the opening operation of the maintenance cover and to be closed in interrelation with the closing operation of the maintenance cover.

However, in the image forming apparatus in JP-A 2009-53315, when the maintenance cover is opened, the image scanner portion is opened in interrelation with the opening operation of the maintenance cover from start of the opening operation. For this reason, even when a maintenance operation can be performed by opening the maintenance cover only slightly, the image scanner portion is moved, so that a load on the user becomes large. Further, a frequency of the movement of the image scanner portion becomes high, so that members in the image scanner portion are liable to be broken due to impact during the movement.

SUMMARY OF THE INVENTION

A principal object of the present invention is to lower a frequency of movement of an image scanner portion when the image scanner portion is moved in interrelation with an opening and closing operation of a maintenance cover.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiments of the image forming apparatus according to the present invention will be specifically described with reference to the drawings.

First Embodiment

A general structure of the image forming apparatus in this embodiment will be described with reference to FIGS. 1 to 3.

Figure 1:
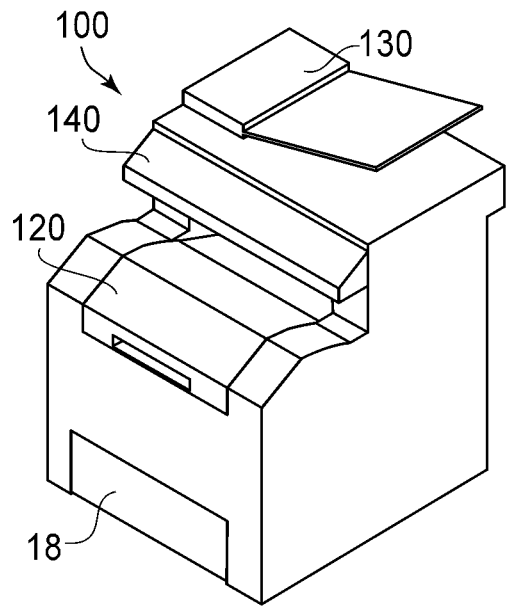
FIG. 1 is a schematic perspective view of an outer appearance of an image forming apparatus.
Figure 2:
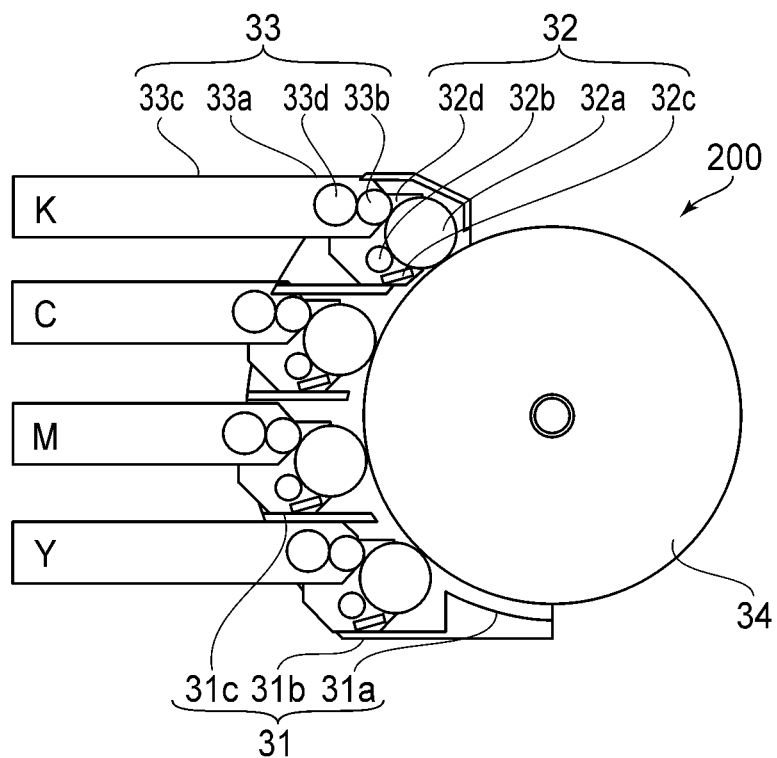
FIG. 2 is a principal longitudinal sectional view of an image forming unit.
Figure 3:
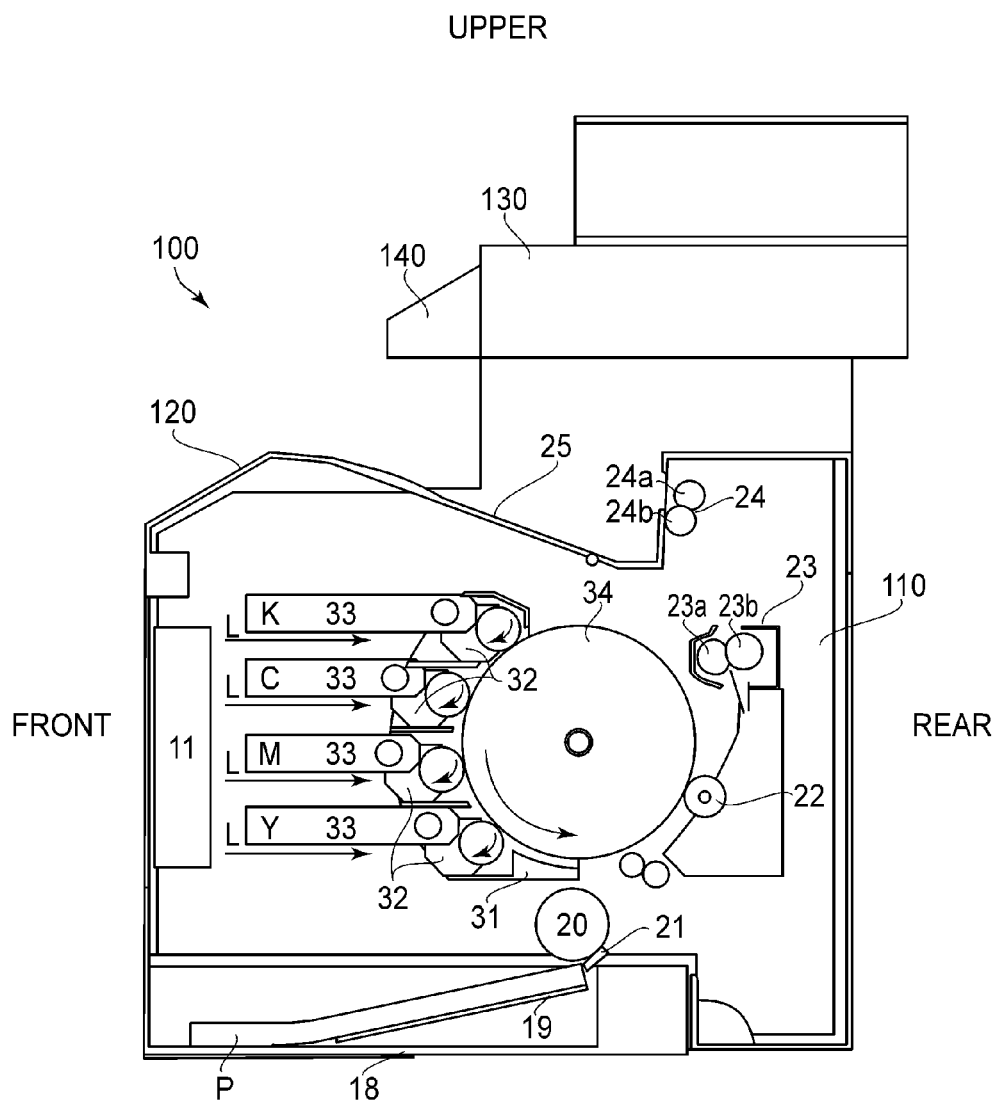
FIG. 3 is a principal longitudinal sectional view of the image forming apparatus.

FIG. 1 is a perspective view of an outer appearance of an image forming apparatus 100 in this embodiment, FIG. 2 is a principal longitudinal sectional view of an image forming unit 200, and FIG. 3 is a principal longitudinal sectional view of the image forming apparatus 100. The image forming apparatus 100 is four-color based full-color laser printer using an electrophotographic process and executes image formation on a recording material or medium (sheet) on the basis of an electrical image signal inputted from an external host device (not shown) such as a personal computer, an image scanner (image reader) or a remote facsimile machine.

In the following description, with respect to the image forming apparatus (apparatus main assembly), a front side refers to a side on which a sheet feeding unit 18 is to be pulled out. A rear side is a side opposite from the front side. An upper side refers to a side on which a maintenance cover 120 is to be opened. Incidentally, in FIG. 3, the front side, the rear side and the upper side of the image forming apparatus are shown. Further, a front-rear direction includes a forward direction directed from the rear side toward the front side of the apparatus main assembly and a backward direction opposite from the forward direction. Left(side) and right(side) are those when the apparatus main assembly is viewed from the front side thereof. A left-right direction include a leftward direction directed from the right toward the left of the apparatus main assembly and a rightward direction opposite from the leftward direction.

The image forming apparatus in this embodiment is configured so that the image forming unit is detachably mountable to the apparatus main assembly and the image scanner which is an image reading portion for reading an original is provided at an upper portion of an image forming portion using an electrophotographic process. Here, examples of the image forming apparatus using the electrophotographic process may include an electrophotographic copying machine, an electrophotographic printer (e.g., a laser beam printer, an LED printer, etc.), a facsimile machine, a word processor, and the like.

Further, the image forming unit is prepared by integrally assembling a developing device, an electrophotographic photosensitive member and an intermediary transfer member into a unit, which is detachably mountable to the apparatus main assembly of the image forming apparatus.

The image forming unit can be mounted in and demounted from the apparatus main assembly by the user himself (herself), so that maintenance of the apparatus main assembly can be easily performed.

The apparatus main assembly in this embodiment includes a main frame 110, an image scanner 130 disposed on the upper side, an operating panel for operating the apparatus main assembly, and the maintenance cover 120 which is a cover member capable of being opened and closed during the maintenance of inside members of the apparatus main assembly.

Inside the apparatus main assembly, the image forming unit 200 for forming an image is provided. The image forming unit 200 includes sub-frames 31, photosensitive member units 32 and an intermediary transfer unit 34, which are configured to be detachably mountable to the apparatus main assembly. The photosensitive member units 32 are disposed at predetermined intervals. Each of the photosensitive member units 32 is rotatably mounted on the sub-frame 31, and a developer image is transferred from the photosensitive member unit 32 onto the recording medium of the main frame.

The sub-frame 31 includes an intermediary transfer unit frame 31a for supporting the intermediary transfer unit 34, a photosensitive member supporting unit 31b for supporting the plurality of photosensitive member units 32, and a developing device connecting unit 31c for supporting a developing cartridge 33.

The photosensitive member unit 32 includes a photosensitive drum 32a as the electrophotographic photosensitive member, a charging roller 32b as a process means acting on the drum 32a, and a cleaning device 32c for removing the developer remaining on a surface of the photosensitive drum 32a. Then, a photosensitive member case 32d accommodating these members is connected to the photosensitive member supporting unit 31b of the sub-frame 31. The plurality of movement units 32 is disposed at a predetermined spacing with respect to the intermediary transfer unit 34.

The developing cartridge 33 includes a developing device case 33a connected to the developing device connecting unit 31c, a developing roller 33b provided at an end of the developing device case 33a, a developing device 33c for accommodating the developer, and a feeding roller 33d for feeding the developer to the developing roller 33d.

The developing cartridge 33 is detachably mountable to the sub-frame 31. The developing device connecting unit 31c guides the developing cartridge 33 toward the photosensitive member unit 32 so that the developing roller is contacted and connected to the photosensitive drum 32a. The developing device connecting unit 31c supports the developing cartridge 33 so that a position of the developing cartridge 33 is stably retained.

On the front side of the developing device connecting unit 31c, the laser scanner unit 11 is disposed. The laser scanner unit 11 outputs laser light L which has been modulated correspondingly to image information of associated color inputted from the external host device and subjects each of the photosensitive drum 32a to scanning exposure to the laser light L.

Below the intermediary transfer unit 34, a sheet feeding unit 18 is disposed. The sheet feeding unit 18 includes a sheet feeding tray 19, a sheet feeding roller 20, a separation pad 21, and the like. The sheet feeding unit 18 can be freely inserted into and pulled out from the apparatus main assembly on the front side of the apparatus main assembly (front loading). At an upper rear portion of the inside of the apparatus main assembly, a fixing device 23 and a discharging roller pair 18 are disposed. The upper surface of the apparatus main assembly constitutes a discharging tray 25. The fixing device 23 includes a fixing film unit 23a and a pressing roller 23b. The discharging roller pair 18 including discharging rollers 24a and 24b.

When the image is formed, the photosensitive drum 32a of each of the photosensitive member units 32 is rotationally driven in the clockwise direction indicated by an arrow at a predetermined control speed and thereon, an electrostatic latent image is formed by exposure depending on the image signal from the image scanner unit 11. On the four photosensitive drums 32a, from a lower side to the upper side, the electrostatic latent images for yellow (Y), magenta (M), cyan (C) and black (K) are formed, respectively. Each of the electrostatic latent images is developed with the developer of associated color into a toner image of the associated color. The resultant toner images are successively primary-transferred from the four photosensitive drums 32 onto the intermediary transfer unit 34 to form a full-color image.

On the other hand, the sheet feeding roller 20 is driven in synchronism with the image formation, and sheets P which are the recording material stacked on the sheet feeding tray 19 are separated and fed one by one to be conveyed to a nip between a secondary transfer roller 22 and the intermediary transfer unit 34. In the nip, the toner images on the intermediary transfer unit 34 are secondary-transferred onto the sheet P. Thereafter, the sheet is introduced into the fixing device 23 by which the toner images are fixed. Then, the sheet is discharged on the discharging tray 25 by the discharging roller pair 24.

<Opening and Closing Constitution>

Figure 4:
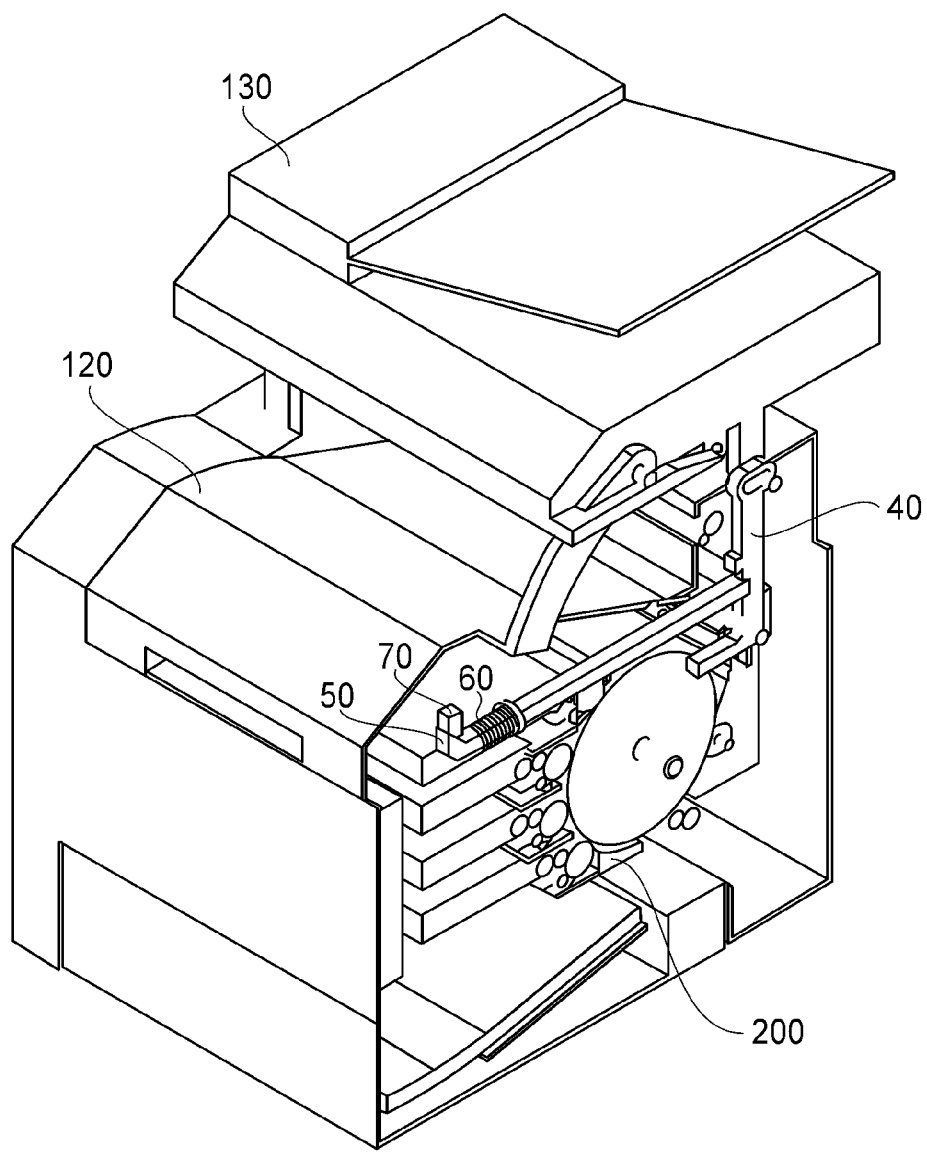
FIG. 4 is a perspective view of the image forming apparatus.
Figure 5A:
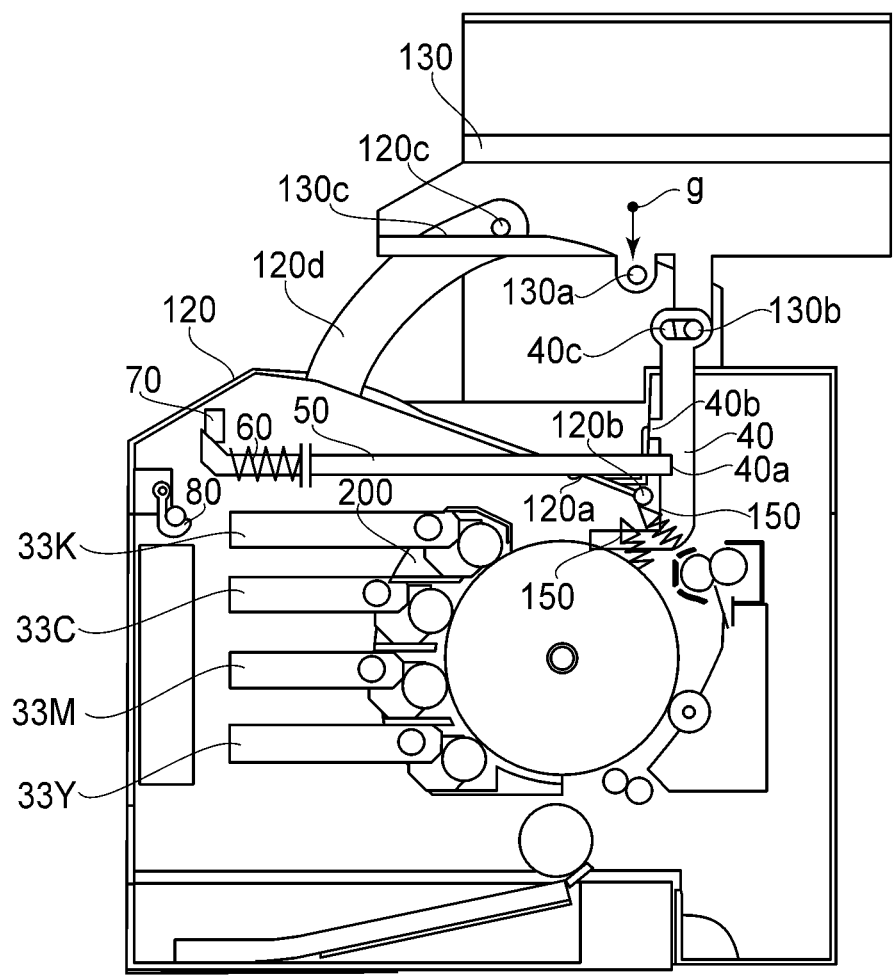
FIGS. 5(a) to 5(c) are principal longitudinal sectional views showing an embodiment of the image forming apparatus.
Figure 5B:
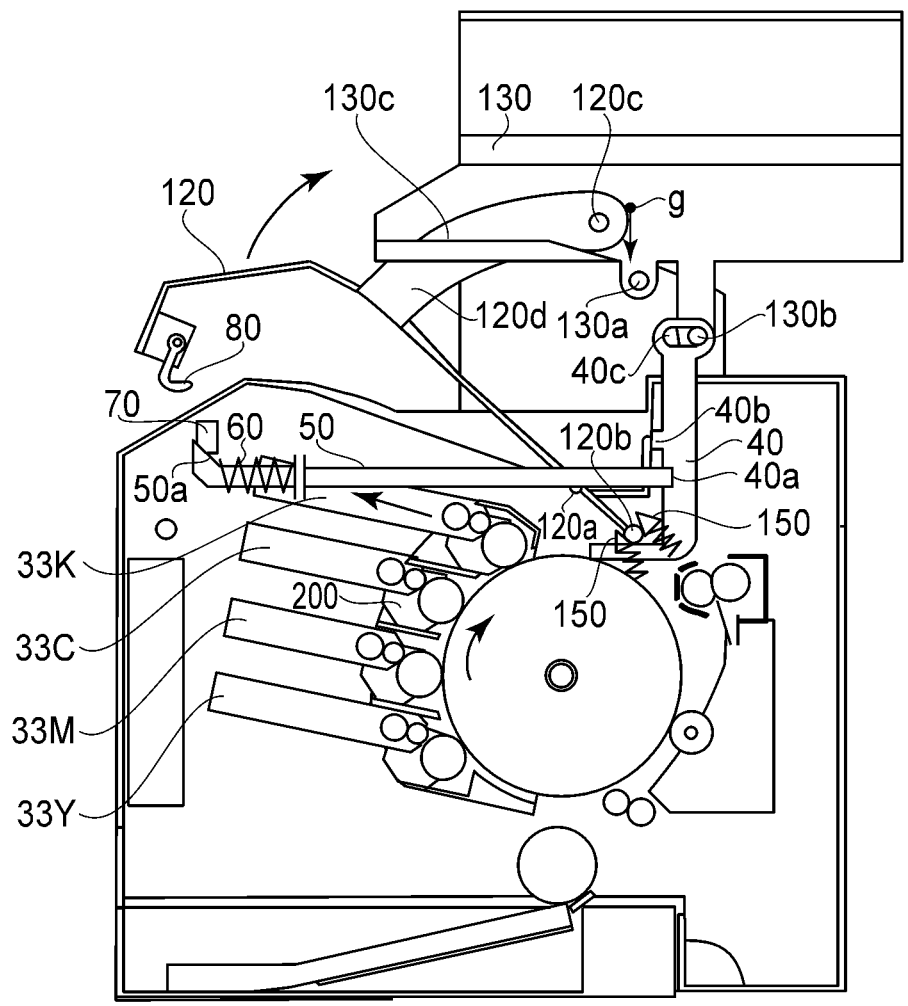
Figure 5C:
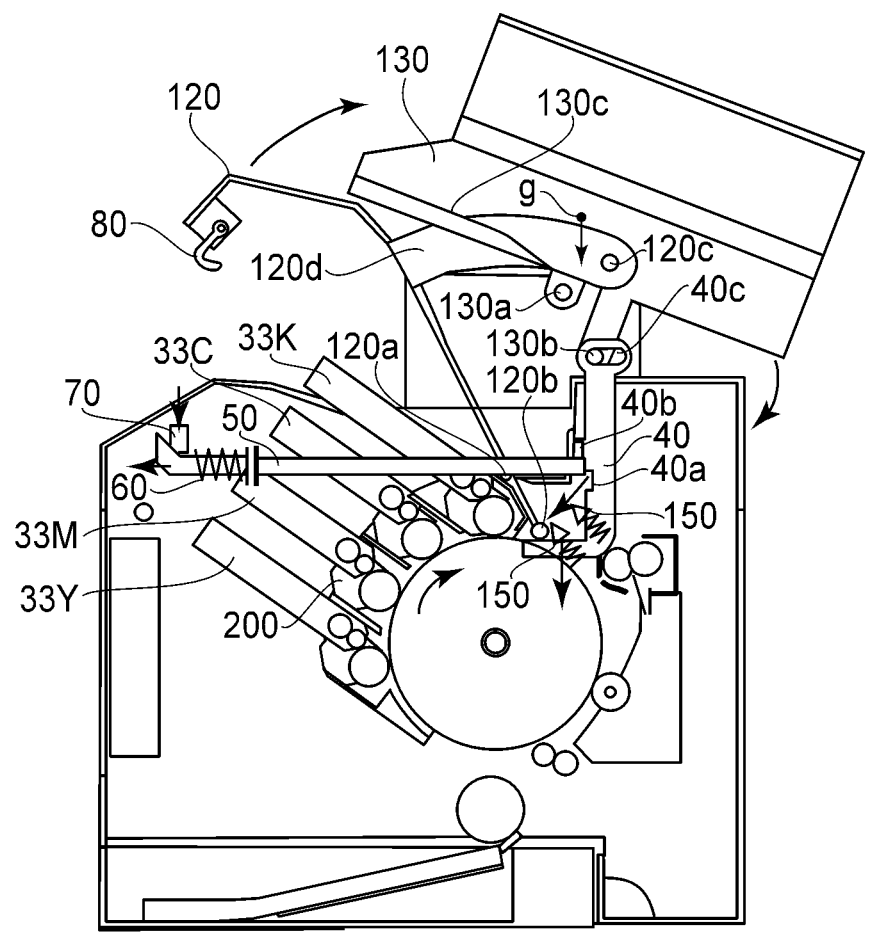

An opening and closing constitution of the image scanner 130 will be described with reference to FIGS. 4 and 5(a) to 5(c). FIG. 4 is a perspective view of an image forming apparatus in this embodiment, and FIGS. 5(a) to 5(c) are principal longitudinal sectional views of the image forming apparatus.

As shown in FIGS. 4 and 5(a) to 5(c), the image scanner 130 is disposed as the image reading portion at the upper portion of the image forming portion. Further, between the image forming portion and the image scanner 130, the maintenance cover 120 is provided.

This image scanner 130 is movable in interrelation with opening and closing of the maintenance cover 120 by an interrelating mechanism. The image scanner 130 is located at a normal set position, in which an original is readable, when the maintenance cover 120 is closed, but is moved from the set position to a retracted position when the maintenance cover 120 is opened. As a result, the maintenance cover 120 can be opened wide. Further, the image scanner 130 is configured to be moved to the set position in interrelation with the closing operation of the maintenance cover 120.

Here, a constitution of the interrelating mechanism for moving the image scanner 130 to the retracted position in interrelation with the opening operation of the cover member 120 and for moving the image scanner 130 to the set position in interrelation with the closing open position of the maintenance cover 120 will be specifically described.

The image scanner 130 is located at a normal position (set position) with respect to the image forming portion in a state in which the maintenance cover 120 is closed (a state in which the maintenance cover 120 is located at a closed position) as shown in FIG. 5(a). At this time, the maintenance cover 120 is supported by the link guide 40 which is vertically slidable with respect to the image forming apparatus. Further, the link guide 40 is prevented from being moved by an arm 50 which is slidable in the front-rear direction of the image forming apparatus.

The maintenance cover 120 is rotationally movable about a rotation shaft 120a and is openable upward by releasing locking of a latch 80. In a first open state of the maintenance cover 120, an operating portion 120b of the maintenance cover 120 provided at one side end portion abuts against the link guide 40. Here, the link guide 40 is bent in an L-shape at its lower end, and the operating portion 120b abuts against this bent portion. Then, when the maintenance cover 120 is opened until the operating portion 120b runs over a projected portion 150 to abut against the link guide 40, the maintenance cover 120 is locked by the projected portion 150 and is kept in the first open state. That is, the maintenance cover 20 is kept in the first open state by the projected portion 150 at a retaining position (First open position) in which the maintenance cover 120 is partly opened. The projected portion 150 includes a triangular urging portion which is urged against the apparatus main assembly by an urging member (urging spring or the like), and is provided at two positions in which two projected portions 150 are contactably mounted so that two inclined surfaces can be abutted against the operating portion 120b.

FIG. 5(b) shows the first open state of the maintenance cover 120. In this state, a black developing cartridge 33K of the four developing cartridges is disposed at an uppermost position so that the user can access the black developing cartridge 33K which has a high use frequency and a large number of times of mounting and demounting. Here, the image forming unit 200 is configured to be rotationally movable upward. For this reason, in the first open state, by rotationally moving the image forming unit 200, the black developing cartridge 33K having the high use frequency can be exchanged without fully opening the maintenance cover 120.

Inside the apparatus main assembly, a release button 70 to which the user can first access when the maintenance cover 120 is in the first open state is provided. That is, the image scanner 130 is locked by a locking mechanism when the maintenance cover 120 is closed, thus being prevented from being moved. Further, the release button 70 constitutes an operating portion of a lock-releasing mechanism for releasing the movement locking of the link guide 40 in the course of the opening operation of the maintenance cover 120. A constitution of the locking mechanism and the look-releasing mechanism will be specifically described. In the state shown in FIG. 5(b), the arm 50 is urged in the rear direction of the apparatus main assembly by a tension spring 60 and one end portion thereof is engaged in a groove 40a formed on the link guide 40. For this reason, the movement of the link guide 40 is prevented, and the link guide 40 is in a locked state.

The arm 50 is mounted slidably in the front-rear direction and is provided with an inclined portion 50a at an end portion on a side where the release button 70 is provided. When the user downward presses the release button 70 which is the operating portion to which the user can access in the first open state, the inclined portion 50a is pressed and thus the arm 50 slides formed. For this reason, the end of the arm 50 engaged in the groove 40a is disengaged from the groove 40a to release the locking, so that the link guide 40 is vertically movable.

In a lock-released state of the link guide 40, when the maintenance cover 120 is further opened, the operating portion 120b provided at the end portion of the maintenance cover 120 starts to press the link guide 40 in the downward direction while running over the projected portion 150.

The image scanner 130 is mounted rotationally movable about the rotation shaft 130a, and a link boss 130c is engaged in a link hole 40c provided at an upper end portion of the link guide 40. The rotation shaft 130a which is the center of rotation of the image scanner 130 is disposed so that the rotation shaft 130a is substantially vertically below a barycentric position (position of the center of gravity) g of the image scanner 130. As a result, when the link guide 40 is moved downward and the link boss 130b is pulled downward, the barycentric position g of the image scanner 130 is moved toward the link boss 130b located on the rear side of the image forming apparatus more than the rotation shaft 130a as shown in FIG. 5(c). For this reason, the image scanner 130 is rotated about the rotation shaft 130a in the clockwise direction by its own weight.

The link guide 40 is, as shown in FIG. 5(c), provided with a locking portion 40 at a predetermined position between the groove 40a and the link hole 40c in a projection manner. The image scanner 130 rotated by its own weight is prevented from being rotated when the end thereof abuts against the locking portion 40b, so that an attitude in which the image scanner is retracted backward is kept.

In this embodiment, as described above, in the state in which the maintenance cover 120 is closed, the rotation shaft 130a of the image scanner 130 is disposed substantially vertically below the barycentric position g of the image scanner 130. For this reason, the image scanner 130 performs its rotation operating from a neutral state, so that a load on the user during the opening and closing of the maintenance cover 120 is alleviated.

FIG. 5(c) shows a state in which the maintenance cover is fully opened. This state is a second open state in which an opening of the maintenance cover can be ensured in a larger area. Also in the second image scanner, the maintenance cover 120 is locked by the projected portion 150 at a second open position and is kept in the second open state. In this state, the image forming unit 200 is rotationally movable further upward. For this reason, the mounting and demounting of the developing cartridges 33Y (yellow), 33M (magenta) and 33C (cyan) and the image forming unit 200 and maintenance such as jam clearance can be performed.

In this embodiment, the black developing cartridge 33K is detachably mountable in the first open state, and other second developing cartridges 33Y, 33M and 33C are detachably mountable in the second open state. However, it is also possible to employ a constitution in which all the developing cartridges are detachably mountable in the first open state and the image forming unit 200 is detachably mountable in the second open state. Further, a constitution in which the jam clearance or exchange of a memory card or the like can be performed inside the apparatus main assembly in the first open state may also be employed. Further, a constitution in which the locking mechanism for locking the movement of the image scanner 130 can be released by further opening the maintenance cover 120 in the first open state may also be employed.

Thus, in this embodiment, by retaining the maintenance cover 120 in the first open state and locking the image scanner 130 with the locking mechanism in the first open state, it is possible to notify the user that the maintenance operation can be performed in the first open state. Further, it is also possible to prevent the user from unnecessarily opening the maintenance cover 120 until the maintenance cover 120 is placed in the second open state.

Further, in this embodiment, the image forming apparatus includes a reading control portion (not shown) for controlling the image reading operation of the image scanner 130. The reading control portion may effect the control so that the image reading operation is not terminated when the maintenance cover 120 is located between the closed position and the first open position in the case where the maintenance cover 120 is opened during the image reading operation. As a result, a frequency unnecessary stop of the image reading operation by the image scanner 130 can be reduced, so that usability can be improved.

Next, an operation when the maintenance cover 120 is closed will be described.

The maintenance cover 120 is provided with an arm portion 120d and is also provided with a projected boss 120c in the neighborhood of an end portion of the arm portion 120d. On the other hand, at a lower portion of the image scanner 130, a guide surface 130c engageable with the boss 120c is formed.

When the closing operation of the maintenance cover 120 is started from the second open state, the boss 120c provided on the maintenance cover 120 abuts against the guide surface 130c of the image scanner 130. From this state, when the maintenance cover 120 is further closed, the image scanner 130 is urged in the closing direction while the boss 120c is contacted to the guide surface 130c, so that the image scanner 130 is rotated about the rotation shaft 130a in the counter-clockwise direction in FIG. 5(c). As a result, the image scanner 130 is restored from the retracted state.

When the image scanner 130 is restored from the retracted state, the link guide 40 engaged with the link boss 130b slides and moves upward. As a result, the end of the arm 50 enters the groove 40a provided on the link guide 40, so that the movement of the link guide 40 is prevented in this state. In this state, the latch 80 is lockable, so that a final closing operation of the maintenance cover 120 is ended.

Incidentally, an image forming unit moving mechanism for rotationally moving the image forming unit 200 in interrelation with the opening and closing of the maintenance cover 120 may also be provided. In this case, the image forming unit moving mechanism moves the image forming unit 200 so that the developing cartridges 33 are moved toward the opening, which is exposed (uncovered) by opening the maintenance cover 120, as the maintenance cover 120 is opened.

In this embodiment, the image scanner 130 is located at the normal position (set position) with respect to the image forming portion and thus is not moved during the opening operation of the maintenance cover 120 from the closed state to the first open state. Further, during the further opening operation of the maintenance cover 120 from the first open state to the second open state, the image scanner 130 is moved from the normal position (set position) to the retracted position with respect to the image forming portion. In the first open state, it is possible to perform the exchange of only a part of the plurality of the developing cartridges, such as the developing cartridge 33K, mounted in the apparatus main assembly, the exchange of the memory card or the like, and the jam clearance. In this embodiment, by employing the constitutions described above, a movement frequency of the image scanner 130 is decreased and thus a series of operations necessary to the maintenance is simplified, so that load of time and operation on the user can be alleviated. That is, when the state of the maintenance cover 120 is placed in the first open state, there is no need for the user to retract the image scanner 130, so that the load of time and operation can be alleviated. Further, it is also possible to reduce a possibility that members inside the image scanner 130 are broken by impact during the retraction and a possibility that a hinge portion or a bundle wire or the like, for electrically connecting the apparatus main assembly, which is provided in the neighborhood of the hinge portion is damaged by the impact during the retraction.

Incidentally, in this embodiment, as the image forming apparatus, the four-color based full-color laser printer using the electrophotographic process is described but the present invention is also applicable to printers of other image forming types such as an ink jet printer.

Second Embodiment

An image forming apparatus in this embodiment will be described with reference to FIGS. 6(a) to 6(c). A basic constitution of the image forming apparatus in this embodiment is identical to that in First Embodiment described above, thus being omitted from redundant description. In this embodiment, a feature of the constitution in this embodiment will be described. Members or means having the same functions as those in First Embodiment are represented by the same reference numerals or symbols.

Figure 6A:
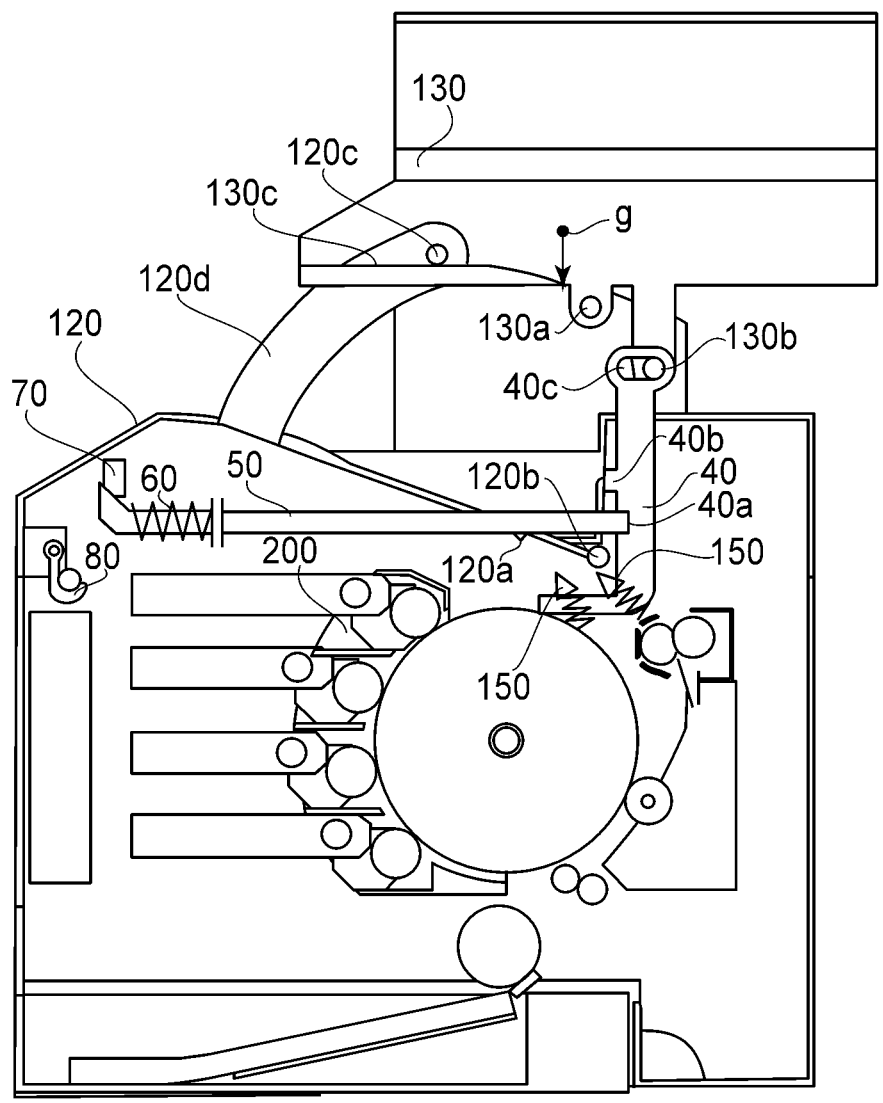
FIGS. 6(a) to 6(c) are principal longitudinal sectional views showing an embodiment of the image forming apparatus.
Figure 6B:
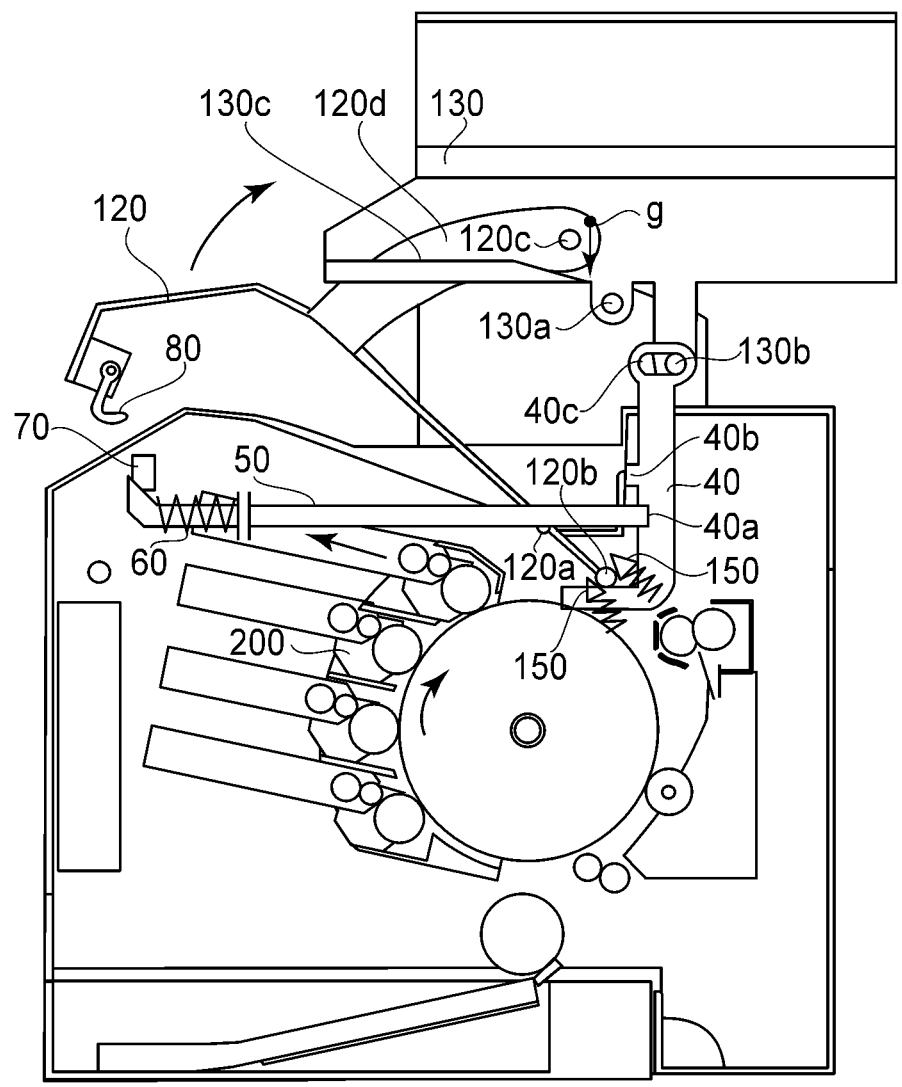
Figure 6C:
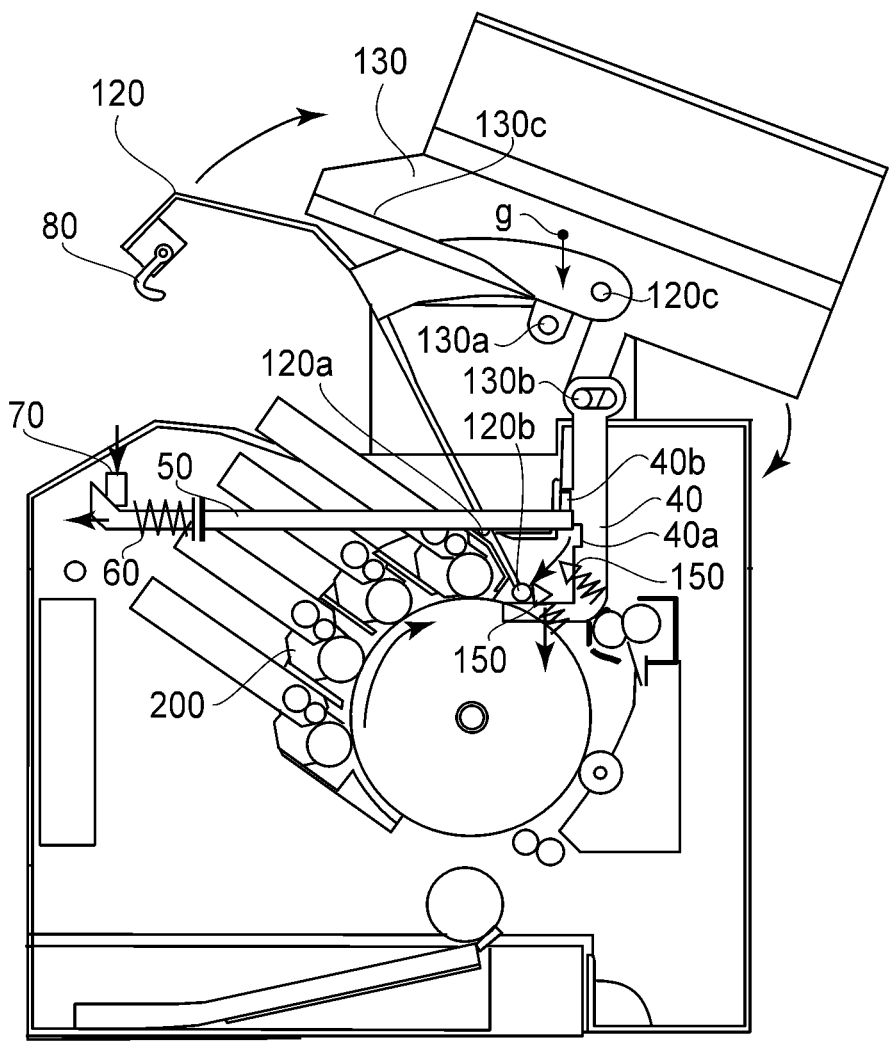

FIGS. 6(a) to 6(c) are principal longitudinal sectional views of the image forming apparatus in this embodiment, wherein a series of operations of the maintenance cover 120 and the image scanner 130 is shown.

In First Embodiment, the barycentric position g of the image scanner 130 is disposed vertically below the rotation shaft 130a. On the other hand, in this embodiment, the barycentric position g of the image scanner 130 is disposed at a frontward position of the apparatus main assembly more than the rotation shaft 130a. As a result, during the movement of the image scanner 130 from the set position to the retracted position by opening the maintenance cover 120, the barycentric position g of the image scanner 130 passes through a vertical line extended upward from the rotation shaft 130a. In this case, a toggle mechanism is constituted by a self weight of the image scanner 130 when the barycentric position g is moved from one side to the other side of the rotation shaft 130a.

Thus, in this embodiment, similarly as in First Embodiment, the series of operations necessary to the maintenance is simplified by decreasing the movement frequency of the image scanner 130, so that it becomes possible to alleviate the load of time and operation on the user. Further, by the toggle mechanism described above, a balance of the image scanner 130 can be kept at the set position located at the forward portion of the apparatus main assembly during a period from a rotatable state of the image scanner 130 to start of rotational motion of the image scanner 130. Therefore, the opening operation of the maintenance cover 120 can be started from a state in which an operating force is decreased and stabilized.

Third Embodiment

An image forming apparatus in this embodiment will be described with reference to FIGS. 7(a) to 7(c). A basic constitution of the image forming apparatus in this embodiment is identical to that in First Embodiment described above, thus being omitted from redundant description. In this embodiment, a feature of the constitution in this embodiment will be described. Members or means having the same functions as those in First Embodiment are represented by the same reference numerals or symbols.

Figure 7A:
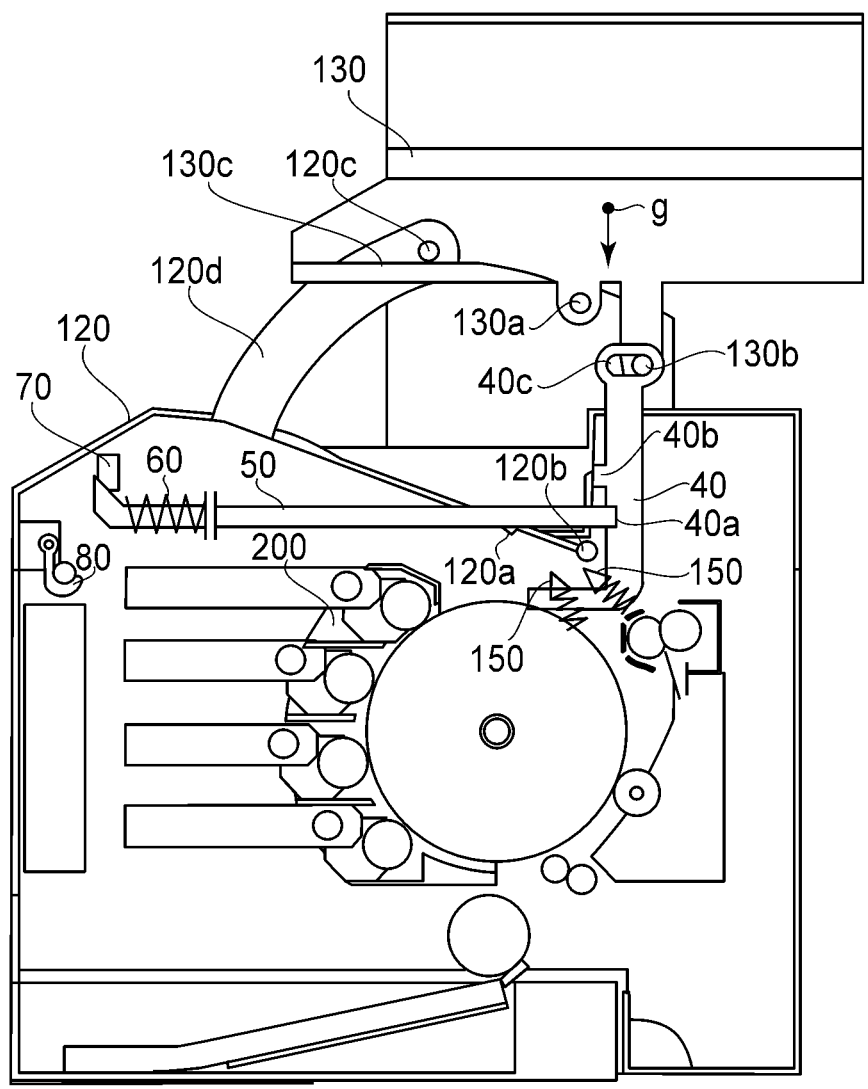
FIGS. 7(a) to 7(c) are principal longitudinal sectional views showing an embodiment of the image forming apparatus.
Figure 7B:
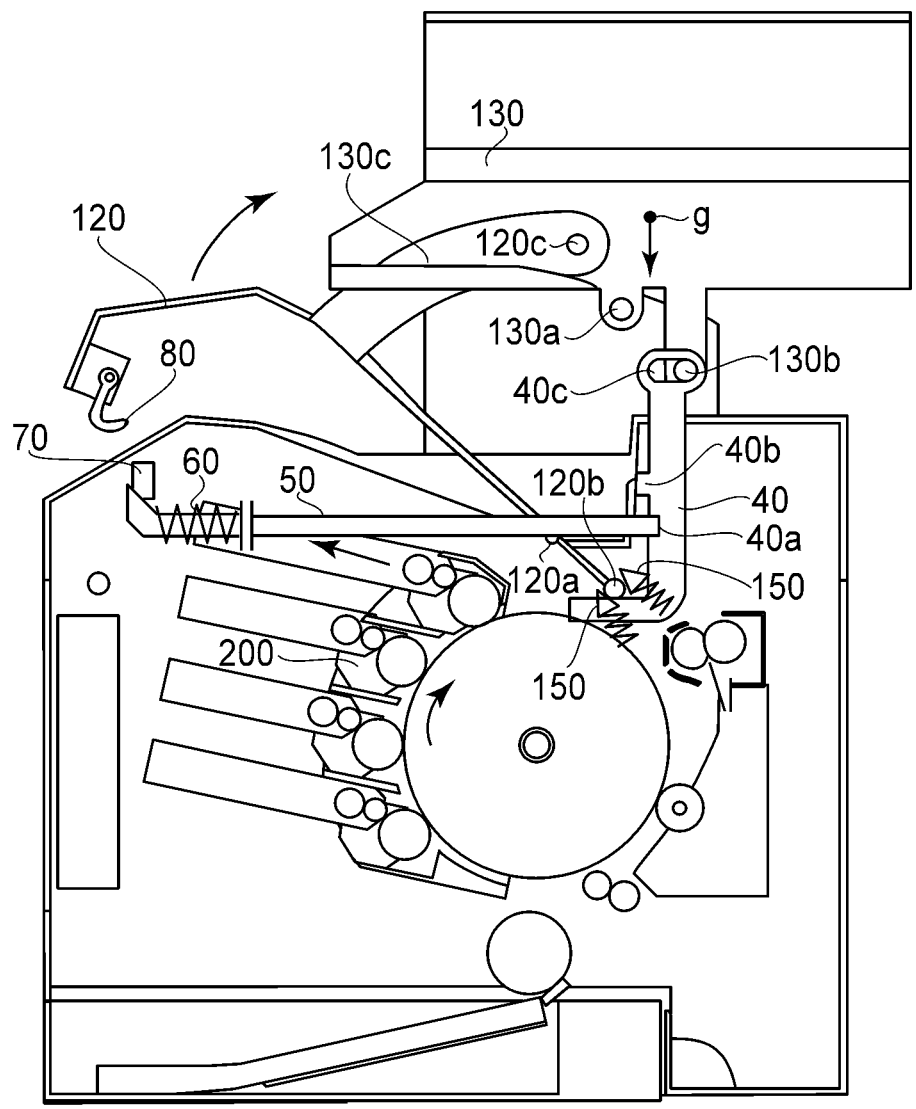
Figure 7C:
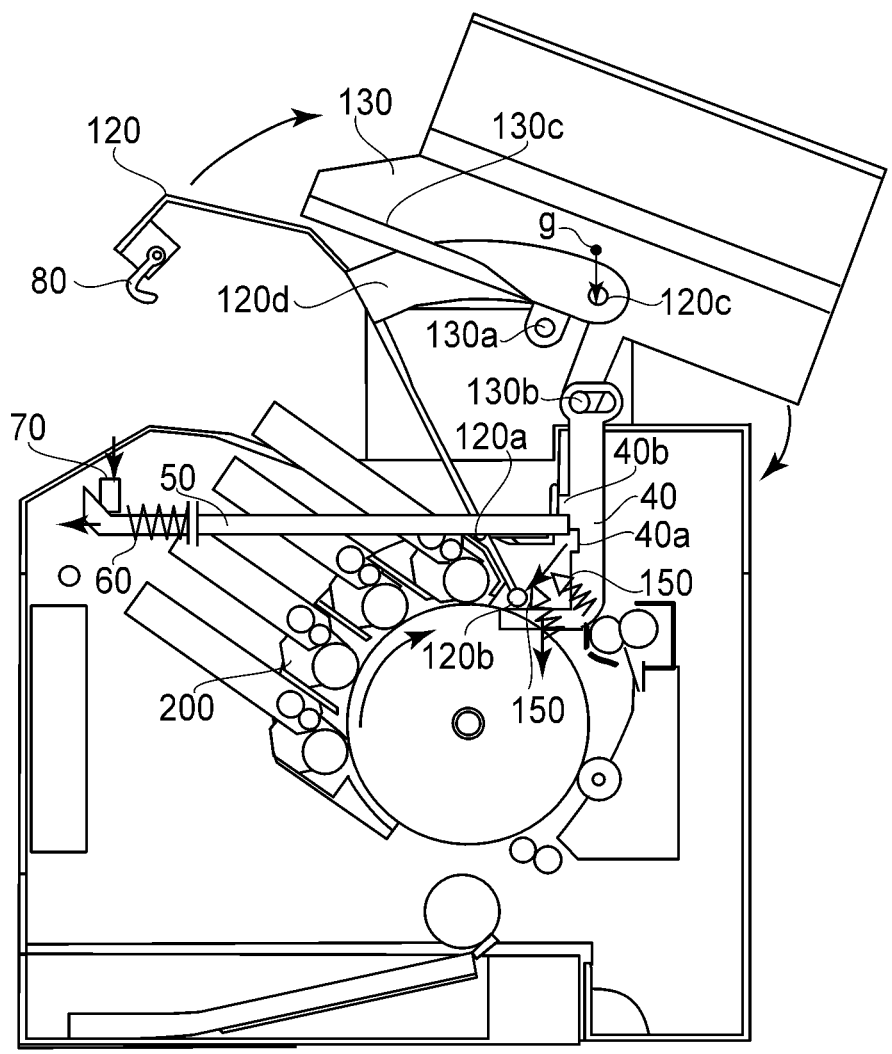

FIGS. 7(a) to 7(c) are principal longitudinal sectional views of the image forming apparatus in this embodiment, wherein a series of operations of the maintenance cover 120 and the image scanner 130 is shown.

In First Embodiment, the barycentric position g of the image scanner 130 is disposed vertically below the rotation shaft 130a. On the other hand, in this embodiment, the barycentric position g of the image scanner 130 is disposed at a rearward position of the apparatus main assembly more than the rotation shaft 130a. By employing such a constitution, in the state in which the image scanner 130 is located at the set position, the self weight of the image scanner 130 acts in a direction toward the retracted position. For this reason, during a process in which the maintenance cover 120 is opened, from the time when the image scanner 130 is rotatable, the self weight of the image scanner 130 acts as an assisting means for moving the image scanner 130 toward the retracted direction. As a result, when the maintenance cover 120 is opened, the load of operation on the user can be further alleviated.

Fourth Embodiment

An image forming apparatus in this embodiment will be described with reference to FIG. 8 and FIGS. 9(a) to 9(c). A basic constitution of the image forming apparatus in this embodiment is identical to that in First Embodiment described above, thus being omitted from redundant description. In this embodiment, a feature of the constitution in this embodiment will be described. Members or means having the same functions as those in First Embodiment are represented by the same reference numerals or symbols.

Figure 8:
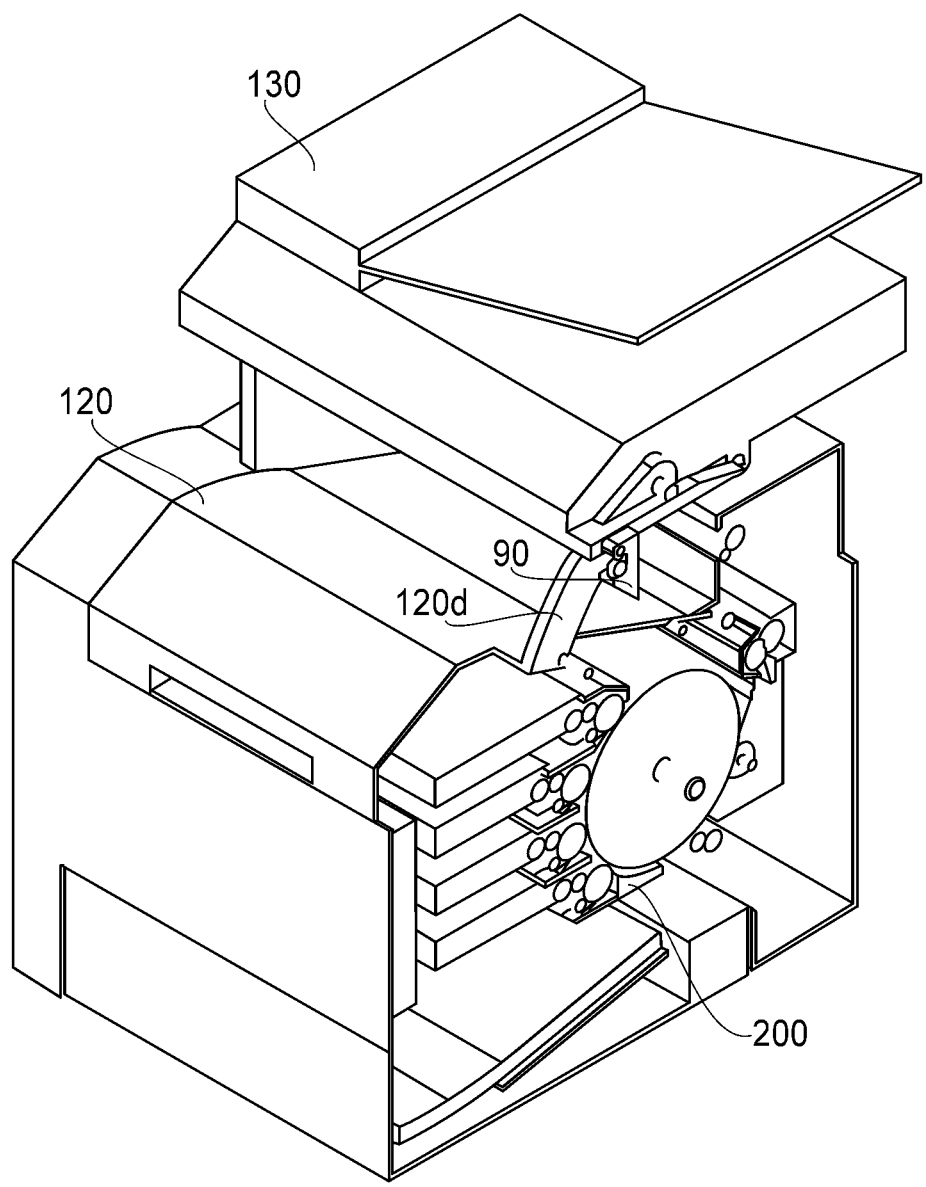
FIG. 8 is perspective view of an image forming apparatus.
Figure 9A:
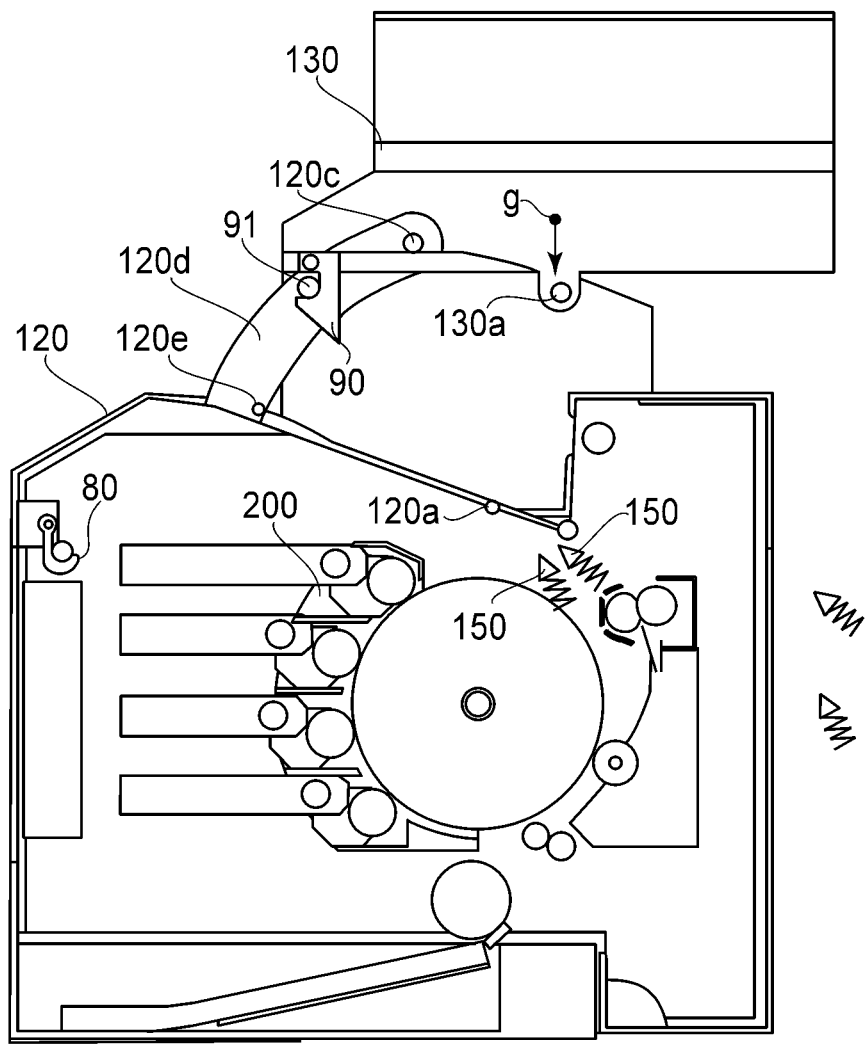
FIGS. 9(a) to 9(c) are principal longitudinal sectional views showing the image forming apparatus.
Figure 9B:
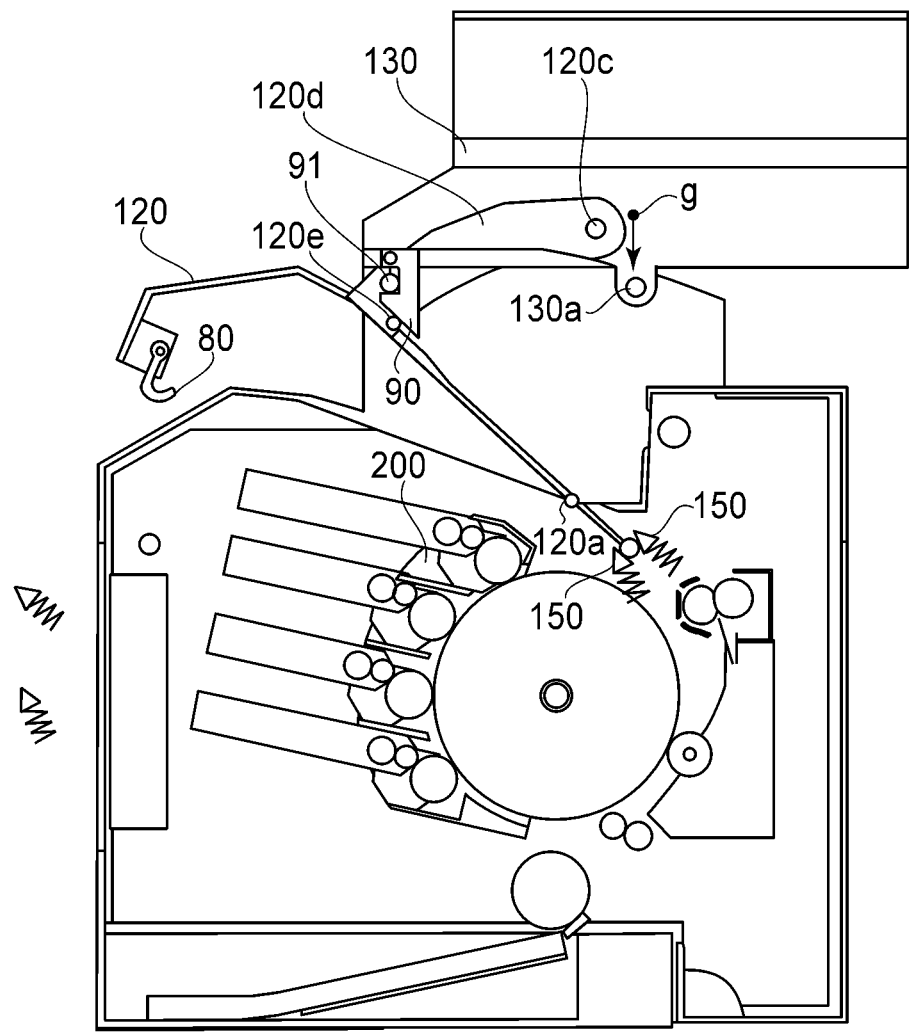
Figure 9C:
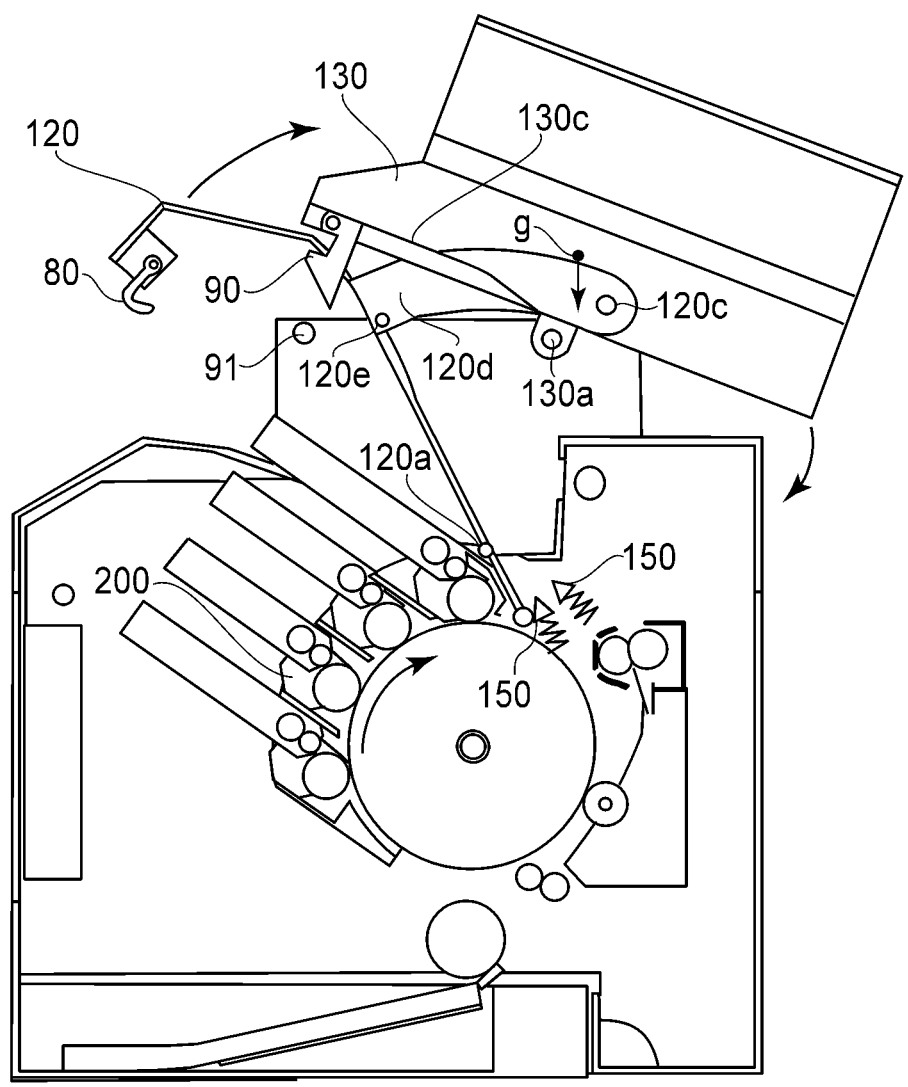

FIG. 8 is a perspective view of the image forming apparatus in this embodiment, and FIGS. 9(a) to 9(c) are principal longitudinal sectional views of the image forming apparatus in this embodiment.

As shown in FIG. 9(a), in the image forming apparatus in this embodiment, the image scanner 130 is disposed above the image forming portion, and the maintenance cover 120 is provided between the image forming portion and the image scanner 130.

In FIG. 9(a), when the image scanner 130 is located at the set position with respect to the image forming portion, an image scanner latch 90 provided on the image scanner 130 is locked and retained by a locking portion 91 provided in the apparatus main assembly.

The maintenance cover 120 is rotationally movable about the rotation shaft 120a and can be opened upward by releasing the latch 80. In the first open state of the maintenance cover 120, a projected portion 120e of the arm portion 120d of the maintenance cover 120 abuts against the image scanner latch 90. In this case, the maintenance cover 120 runs over the projected portion 150 and is locked by the projected portion 150, thus being kept in that state.

FIG. 9(b) shows the first open state of the maintenance cover 120. In this state, the user can access to the black developing cartridge 33K which has the high use frequency and the large number of times of the mounting and demounting.

The user cannot access to the image scanner latch 90 until the maintenance cover 120 is in the first open state described above. In this state, when the user presses the image scanner latch 90, the image scanner latch 90 is released from the locking portion 91. When the user further presses up the maintenance cover 120, the barycentric position g located substantially vertically above the rotation shaft 130a which is the center of rotation of the image scanner 130 is moved toward the rear side of the image forming apparatus, so that the image scanner 130 is rotated by itself and abuts against an abutment portion (not shown), thus keeping its attitude. Incidentally, in the first open state, it is also possible to employ a constitution in which the locking between the image scanner latch 90 and the locking portion 91 is releasable by further opening the maintenance cover 120.

By disposing the rotation center of the image scanner 130 at a position substantially vertically below the barycentric position g of the image scanner 130, the load on the user when the user opens and closes the maintenance cover 120 is alleviated.

FIG. 9(c) shows the second open state of the maintenance cover 120, in which the maintenance cover 120 is in a full open state to ensure the opening in a larger area.

For the closing operation of the maintenance cover 120, when the closing operation of the maintenance cover 120 is started from the second open state, the boss 120c provided on the maintenance cover 120 abuts against the guide surface 130c of the image scanner 130. From this state, when the closing operation is further continued, the boss 120c urges the image scanner 130 in the closing direction and thus the image scanner latch 90 provided on the image scanner 130 is rotated to be locked by the locking portion 91 provided on the main frame 110. The closing operation is finally completed in a state in which the latch 80 is locked by the main frame 110.

By employing the constitution described above, the series of operations necessary to be performed in a conventional constitution can be simplified, so that the load of time and operation on the user can be reduced.

Fifth Embodiment

An image forming apparatus in this embodiment will be described with reference to FIG. 10 and FIGS. 11(a) and 11(c). A basic constitution of the image forming apparatus in this embodiment is identical to that in First Embodiment described above, thus being omitted from redundant description. In this embodiment, a feature of the constitution in this embodiment will be described. Members or means having the same functions as those in First Embodiment are represented by the same reference numerals or symbols.

Figure 10:
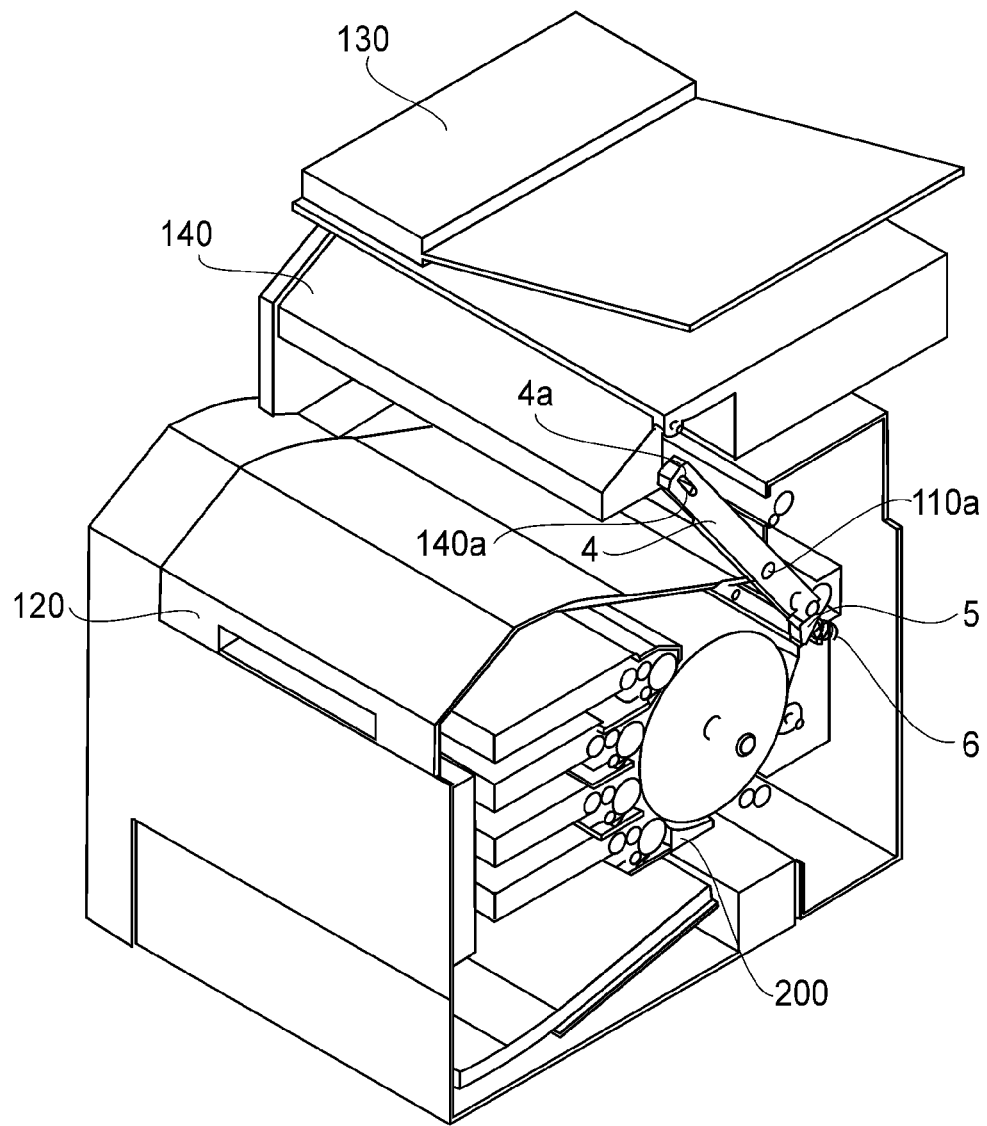
FIG. 10 is a perspective view of an image forming apparatus.
Figure 11:
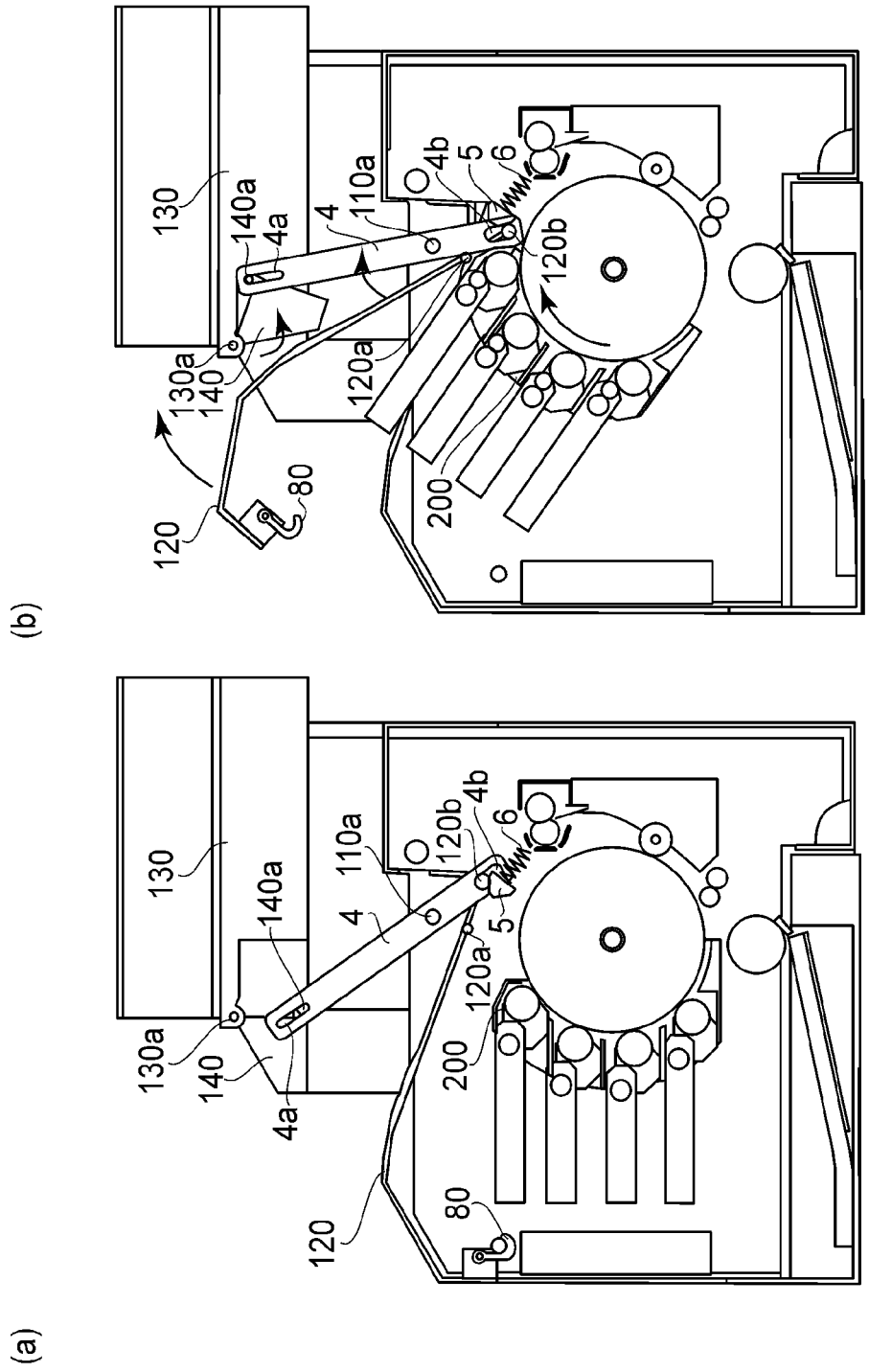
FIGS. 11(a) and 11(b) are principal longitudinal sectional views showing the image forming apparatus.

FIG. 10 is a perspective view of the image forming apparatus in this embodiment, and FIGS. 11(a) and 11(c) are principal longitudinal sectional views of the image forming apparatus in this embodiment.

In First Embodiment, the entire image scanner 130 is configured to be rotationally moved in interrelation with the opening and closing of the maintenance cover 120 but in this embodiment, an operating panel 140 which is a part of the image scanner 130 is configured to be rotationally moved in interrelation with the opening and closing of the maintenance cover 120.

The image scanner 130 in this embodiment is provided with the operating panel 140 which is an operating portion at which operation setting of the image forming apparatus is made. In FIG. 11(a), the operating panel 140 is located at the set position with respect to the image forming portion and is held by a link arm 4 through a locking portion 5 which is slidably movable. This link arm 4 is mounted, to the apparatus main assembly, rotationally movably about a rotation shaft 110a.

In an elongated hole 4a formed at one end portion of the link arm 4, a boss 140a of the operating panel 140 is engaged. Further, in an elongated hole 4b formed at the other end portion of the link arm 4, the operating portion 120b formed at the end portion of the maintenance cover 120 is engaged. The maintenance cover 120 is mounted rotationally movable about the rotation shaft 120a.

Against the operating portion 120b, a locking portion 5 abuts. The locking portion 5 includes a triangular urging portion urged against the apparatus main assembly by an urging member (urging spring or the like) and is mounted in a contactable manner so that two inclined surface portions thereof can abut against the operating portion o120b.

When the maintenance cover 120 is opened, the maintenance cover 120 is openable upward by releasing the latch 80. When the maintenance cover 120 is opened upward, the link arm 4 engaged with the operating portion 120b starts its rotation about the rotation shaft 110a, so that the operating panel 140 engaged in the elongated hole 4a of the link arm 4 is rotated about the rotation shaft 130a. That is, when the maintenance cover 120 is opened upward, the operating panel 140 is moved from a first position on a locus of movement of the maintenance cover 120 to a second position in which the operating panel 140 is retracted from the movement locus in interrelation with the opening operation of the maintenance cover 120.

During the opening and closing operation of the maintenance cover 120, the locking portion 5 is urged by the operating portion 120b formed at the end portion of the maintenance cover 120, thus including a retaining mechanism for retaining the full open state and the closed state of the maintenance cover 120.

FIG. 11(b) shows the full open state of the maintenance cover 120. Only by the operation of the maintenance cover 120, the operating panel 140 can be retracted in interrelation therewith and thus the opening of the maintenance cover 120 can be ensured in a larger area. Through the opening, it is possible to perform the mounting and demounting of all the developing cartridges and the image forming unit 200 and the maintenance such as the jam clearance. The closing operation is the reverse of the opening operation described above.

In this embodiment, a carriage (not shown) which is movable in the image scanner 130 and includes the image reading means for reading an original image by movement is provided at a portion which is not moved in the image scanner 130.

As described above, in this embodiment, different from the constitution in which the entire image scanner 130 is moved, only a part intended to be retracted (moved away) from the maintenance cover 120 is moved. Further, in a space formed by retracting (moving away) the part of the image scanner 130, at least a part of the maintenance cover 120 is located. Thus, a portion other than the operating panel 140 which is the movable portion of the image scanner 130 is not moved. As a result, compared with the constitution in which the entire image scanner 130 is moved, the load on the user when the maintenance cover 120 is opened and closed is reduced. Further, it is possible to reduce a possibility that a member, particularly the carriage or the like is broken.

Incidentally, when the maintenance cover 120 is opened and closed, as the part of the image scanner movable between the set position and the retracted position in interrelation therewith, it is possible to employ a constitution in which, e.g., a display portion for displaying a state of the image forming apparatus is made movable in place of the operating panel 140 described above.

By employing the constitution described above, the series of operations necessary to be performed in a conventional constitution can be simplified, so that the load of time and operation on the user can be reduced.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications Nos. 288008/2009 filed Dec. 18, 2009, and 266475/2010 filed Nov. 30, 2010, which are hereby incorporated by reference.

What is claimed is:

1. An image forming apparatus comprising:
   a cover member which is openable and closable with respect to a main assembly of said image forming apparatus; and
   an image reading portion, movable to a first position and a second position which is retracted from an image forming portion more than the first position, for reading an image of an original,
   wherein said cover member is movable to a first open position in which said cover member is open with respect to the main assembly and to a second open position in which said cover member is further open with respect to the main assembly, and
   wherein said image reading portion is rested at the first position during movement of said cover member from a closed position to the first open position and is moved from the first position to the second position in interrelation with said cover member during movement of said cover member from the first open position to the second open position and is moved from the second position to the first position in interrelation with movement of said cover member from the second open position toward the closed position.

2. An apparatus according to claim 1, further comprising a plurality of cartridges, detachably mountable into the main assembly, for forming images,
   wherein only a part of the plurality of cartridges is detachably mountable when said cover member is located at the first open position.

3. An apparatus according to claim 2, further comprising an opening to be exposed by opening said cover member with respect to the main assembly and moving device for moving the plurality of cartridges, mounted inside the main assembly, at an inside of the main assembly,
   wherein said moving device moves the plurality of cartridges toward said opening in interrelation with the movement of said cover member from the closed position to the first open position.

4. An apparatus according to claim 2, wherein all the plurality of cartridges are detachably mountable when said cover member is located at the second open position.

5. An apparatus according to claim 2, wherein each of the plurality of cartridges includes a developing device for developing with a developer a latent image formed on a photosensitive member.

6. An apparatus according to claim 2, wherein the part of the plurality of cartridges is a black developing cartridge.

7. An apparatus according to claim 1, wherein the movement of said image reading portion is rotational movement about a rotation shaft of said image reading portion, and the rotation shaft is located below the center of gravity of said image reading portion with respect to a substantially vertical direction.

8. An apparatus according to claim 7, wherein the center of gravity of said image reading portion passes through vertically above the rotation shaft when said image reading portion is moved from the first position to the second position.

9. An image forming apparatus comprising:
a cover member which is openable and closable with respect to a main assembly of said image forming apparatus and which is capable of exposing an inside of the main assembly;
an image reading portion, movable to a first position and a second position which is retracted from an image forming portion more than the first position, for reading an image of an original; and
inside the main assembly, a plurality of cartridges each for forming an image on a recording material,
wherein said cover member is movable to a first open position in which said cover member is open with respect to the main assembly and to a second open position in which said cover member is further open with respect to the main assembly,
wherein said image reading portion is rested at the first position during movement of said cover member from a closed position to the first open position and is moved from the first position to the second position in interrelation with said cover member during movement of said cover member from the first open position to the second open position, and
wherein only a part of the plurality of cartridges is detachably mountable when said cover member is located at the first open position.

10. An apparatus according to claim 9, wherein all the plurality of cartridges are detachably mountable when said cover member is located at the second open position.

11. An apparatus according to claim 9, wherein only a part of the plurality of cartridges is detachably mountable when said cover member is located at the first open position, and wherein the part of the plurality of cartridges is a black developing cartridge.

12. An image forming apparatus comprising:
a cover member which is openable and closable with respect to a main assembly of said image forming apparatus; and
an image reading portion for reading an image of an original, said image reading portion including a main body of said image reading portion and a movable portion relative to said main body of said image reading portion,
wherein when said cover member is moved from a closed position, in which said cover member is closed with respect to the main assembly, to an open position in which said cover member is open with respect to the main assembly, said movable portion is moved from a first position to a second position without movement of said main body, and
wherein at least a part of said cover member is located in a space formed by movement of said movable portion from the first position to the second position.

13. An apparatus according to claim 12, wherein the part of said image reading portion includes an operating portion.

14. An apparatus according to claim 12, wherein the part of said image reading portion includes a display portion.

15. An apparatus according to claim 12, wherein said movable portion is rotated and moved from said first position to said second position,
wherein said cover member is rotated and moved from said closed position to said open position, and
wherein a rotational direction of said movable portion during rotation of said movable portion from the first position to the second position is opposite to a rotational direction of said cover member during rotation of said cover member from said closed position to said open position.

* * * * *